United States Patent
Popke

(10) Patent No.: US 6,783,306 B2
(45) Date of Patent: Aug. 31, 2004

(54) CUTTING TOOL USING A SUBDIVISION IN CUTTING

(75) Inventor: Herbert Popke, Muhlenweg (DE)

(73) Assignee: Wilhelm Fette GmbH, Schwarzenbek (DE)

( * ) Notice: Subject to any disclaimer, the term of this patent is extended or adjusted under 35 U.S.C. 154(b) by 32 days.

(21) Appl. No.: 10/174,795

(22) Filed: Jun. 18, 2002

(65) Prior Publication Data

US 2003/0002931 A1 Jan. 2, 2003

(30) Foreign Application Priority Data

Jun. 28, 2001 (DE) .......................................... 101 31 357

(51) Int. Cl.$^7$ ................................................. B26B 1/00
(52) U.S. Cl. ........................ 407/113; 407/114; 407/34
(58) Field of Search ................................. 407/113, 114, 407/115, 34, 35

(56) References Cited

U.S. PATENT DOCUMENTS 5,727,910 A * 3/1998 Leeb ........................... 407/34
5,810,519 A * 9/1998 Vogel et al. ................ 407/114
5,908,071 A * 6/1999 Hutchinson et al. ....... 166/55.6
6,193,446 B1 * 2/2001 Astrom et al. .............. 407/114

FOREIGN PATENT DOCUMENTS

| EP | 0 480 576 | 4/1992 |
| EP | 0 585 871 | 3/1994 |
| EP | 0 814 932 | 1/1998 |

* cited by examiner

*Primary Examiner*—Willmon Fridie, Jr.
(74) *Attorney, Agent, or Firm*—Vidas Arrett & Steinkraus, P.A.

(57) ABSTRACT

A rotary cutting tool with a holder body rotating about a central axis on which at least one cutting blade is mountable which has at least one cutting edge that gets in a metal-cutting engagement with a workpiece when the holder body rotates while simultaneously undergoing a linear forward feed, wherein the cutting blade is adapted to be advanced to a predetermined cutting depth, characterized in that the cutting edge of the cutting blade is comprised of at least two cutting edge portions which are disposed in an offset relationship in such a way that they make a partial contribution each to the predetermined cutting depth by means of a different setting angle.

16 Claims, 4 Drawing Sheets

CUTTING TOOL USING A SUBDIVISION IN CUTTING

CROSS-REFERENCE TO RELATED APPLICATIONS

Not Applicable.

STATEMENT REGARDING FEDERALY SPONSORED RESEARCH

Not Applicable.

BACKGROUND OF THE INVENTION

More specifically, the invention relates to a cutting tool having at least one cutting blade which is attachable to a holder body and, while the cutting tool rotates relative to a workpiece, gets into a chip-cutting engagement with a workpiece if the holder body or workpiece undergoes a linear feed motion at the same time.

A typical example for such a cutting tool is a surface-milling cutter or cornering cutter which, for example, is loaded with reversible cutting blades. The reversible cutting blades typically are uniformly mounted on the circumference of the holder body in a predetermined pitch.

Reversible cutting blades are commonly used on such tools, but also on specific drilling tools, reamers or the like. Another application is the one for lathe tools. The invention which will be explained below, however, is not limited to using reversible cutting blades although substantial reference is made thereto for the purposes of explanation.

Reversible cutting blades are commonly loaded either directly into appropriate pockets of the holder body in a known manner or use so-called cassettes which, in turn, are fixed in pockets of the holder body.

The positioning of the cutting edge relative to the axis of the holder body is of significance for the way of action of such a cutting tool, e.g. a milling cutter. The determining factors are the axial angle, the radial angle, and the setting angle. The axial angle means the relative position of a cutting blade or its edge with respect to the axis of rotation of the milling cutter body. The radial angle is the angle between the plane of the milling blade and a radius of the holder body. The setting angle is the angle which the cutting edge has with respect to the direction of tool feed. All of the angles usually are unlike 90°. For obvious reasons, efforts are made not to allow the cutting edge to engage the workpiece simultaneously across the whole length of the cutting edge, but gradually while starting from one end. This minimizes the stress acting on the cutting blade and the cutting edge, and the vibrations which naturally occur because of cutting blade bumps while metal-cutting is done with several blades.

A series of parameters play a role while metal-cutting is done with the cutting tools described. The desirable feature is a large stock removal per unit time at a minimal stress of the cutting edge and a minimum of cutting force. The cutting force naturally has an effect on energy consumption during a metal-cutting operation. High stresses acting on the cutting edge result in short tool service lives and, hence, cause replacing operations which are time-consuming and have an impact on the entire time of manufacture. Further, the expenditure in manufacture is influenced by the different conditions in using cutting blades. In the conventional metal-cutting technique, the cutting blades are identically positioned and oriented on the holder body so that only certain areas of a cutting edge are subjected to a particular stress in most cases. As soon as the most stressed area of the cutting edge has ceased to be usable the cutting blades requires to be exchanged or reversed. The result is that the cutting blade is incompletely utilized.

It is known to achieve a dampening action by arranging the cutting blades at a differing pitch on the circumference of the holder body.

EP 0 480 576 and EP 0 585 871 have made known reversible cutting blades in which the cutting edges are broken up into cutting edge portions between which there is a step each. The cutting edge portions ascend like a ramp between the steps and the arrangement is such as to cause the cutting edge portions to overlap in the stepped area. Efforts are made to avoid or minimize chatter and to produce separate metal-cutting portions here. The setting angle is constant for the known cutting blades over the length of their cutting edge.

EP 0 814 932 has made known a cutting blade in which the cutting edge is also broken up in stepped cutting edge portions with the transition point of the steps being chosen so as to form an obtuse angle. Furthermore, the cutting edge portions are situated on the surface area of an imaginary cylinder. The known cutting blade is intended to improve the chip-breaking characteristic, to reduce the cutting force, and to minimize wear.

It is the object of the invention to improve a cutting tool of the generic type in a way such as to minimize the cutting force and to obtain a larger stock removal with the machine performance remaining the same. Furthermore, it is intended to be an object to improve the utilization of the cutting edges.

BRIEF SUMMARY OF THE INVENTION

The cutting depth is determined by the rate at which the cutting tool or the workpiece is fed in the machine. In conventional cutting tools, the feed motion is such that the larger area gets into engagement with the workpiece over the length of the continuous cutting edge. In the invention, however, only single portions each of the cutting edge of a cutting blade will get into engagement with the workpiece. In the inventive cutting tool, the at least one cutting edge is also subdivided into stepped portions. The fact essential to the invention, however, is that the setting angle of the cutting edge portions differs. Thus, the invention provides a subdivision in cutting with respect to the cutting edge employed and, by doing so, can vary the setting angle on the tool so as to make it engage differently depending on the position of the cutting edge portion. As is known the "lowermost" end portion of a cutting edge is most subjected to wear. Such wear is reduced by making the setting angle relatively small. In order to achieve a large stock removal notwithstanding this the setting angle may be increased for the remaining or upper portion of the cutting edge. Therefore, the invention allows to increase the service life at the cutting edge ends which as was mentioned are subjected to most stress, or to enhance productivity. These advantages may be achieved with no need to change anything to the conventional pitch on the holder tool or the seat of the cutting edge on the holder body.

In the inventive cutting tool, the cutting edges may be offset in the direction of cut or the direction of feed. If three or more cutting edge portions are contemplated an offset may be made between adjacent cutting edge portions in both the direction of cut and direction of feed. It is preferred to reduce the setting angle towards the lower portions of the cutting edge from the topmost portion. What is meant by the "lower" and "upper" ends herein is that the end of the cutting edge that plunges farthest is the lower end and, accordingly, the other end is the upper one.

BRIEF DESCRIPTION OF THE SEVERAL VIEWS OF THE DRAWINGS

Embodiments of the invention are explained in more detail below with reference to the drawings.

DETAILED DESCRIPTION OF THE INVENTION

Figure 1:
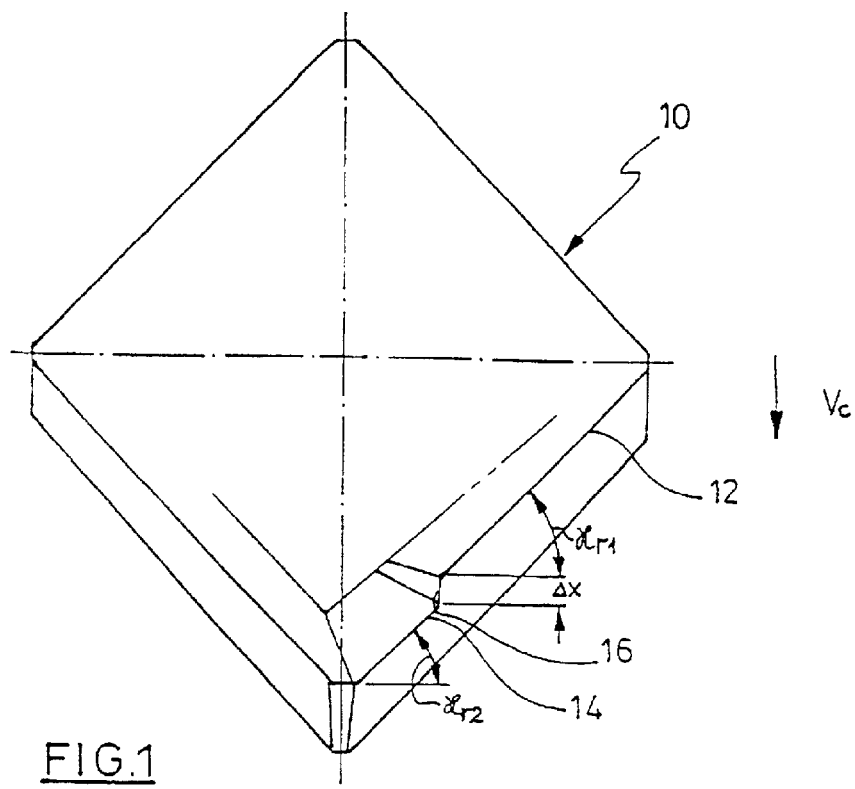
FIG. 1 schematically shows a perspective view of a first embodiment of the cutting blade according to the invention.

While this invention may be embodied in many different forms, there are described in detail therein a specific preferred embodiment of the invention. This description is an exemplification of the principles of the invention and is not intended to limit the invention to the particular embodiment illustrated.

The embodiments shown in the drawings show a reversible cutting blade of an approximately square contour. However, the explanations which follow only describe one side of the reversible cutting blades. A more detailed explanation on the chip-cutting surfaces and the tool flanks is not made. In addition, the holder body which, for instance, along with at least one of the reversible cutting blades, forms a milling cutter such as a surface milling cutter or a pressure-exerting tool, is not illustrated either. What is outlined are merely the setting angles of the cutting edges or those of the cutting blades which are κ. Nor are the other substantial angles outlined, e.g. the axial angle and the radial angle. They are within the range common for and preferred by a person skilled in the art. Finally, the way of mounting the reversible cutting blades is not illustrated either. These may be mounted by means of usual loading mechanisms via a central bore located in the cutting blades or even by means of cassettes.

The reversible cutting blade 10 of FIG. 1, for the more distinctly emphasized cutting edge, has two offset cutting edge portions 12 and 14 which merge into each other via a step 16. The cutting edge portion 12 when inserted in a holder has a setting angle of $\kappa_{r1}$ and the cutting edge portion 14 has a setting angle of $\kappa_{r2}$. $\kappa_{r1}$ is larger than $\kappa_{r2}$ here. The direction of cut is indicated by the arrow $V_c$. The height of the step is indicated as being $\Delta X$. Hence, the reversible cutting blade illustrated in FIG. 1 is divided once in the direction of cut. This way helps obtain two separate chips.

Figure 2:
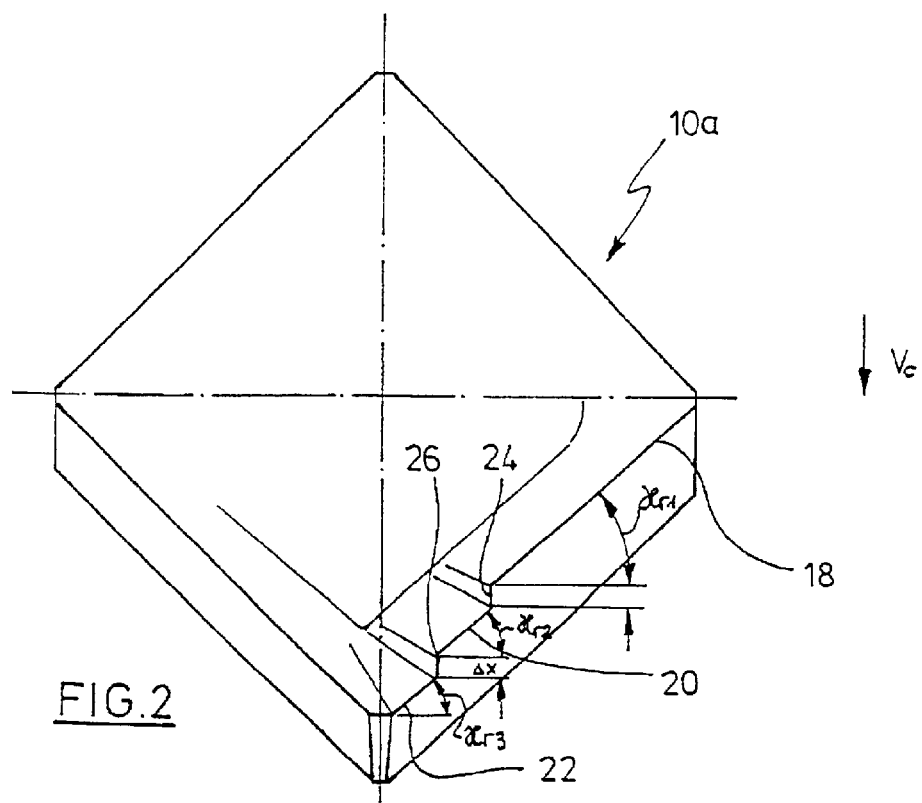
FIG. 2 schematically shows a perspective view of a second embodiment of the cutting blade according to the invention.

The cutting edge of the reversible cutting blade of FIG. 2 is subdivided into three offset cutting edge portions 18, 20, and 22 which form a steps 24, 26 each which is comparable to the step 16 of FIG. 1. The cutting edge portion 18, in turn, has a setting angle of $\kappa_{r1}$, the cutting edge portion 20 has a setting angle of $\kappa_{r2}$, and the cutting edge portion 22 has a setting angle of $\kappa_{r3}$. $\kappa_{r1}$ is larger than $\kappa_{r2}$ and κr2 is larger as $\kappa_{r3}$ here. The height of the steps is indicated as being $\Delta X$ each. It can be recognized that the cutting edge portion which is in engagement with the workpiece in the "deeper" area has a smaller setting angle than have the higher-located cutting edge portions. This caused a stress relief of the most heavily loaded cutting edge portions. As can further be recognized the offset of the cutting edge portions of the above embodiments is in the direction of cut $V_c$.

Figure 3:
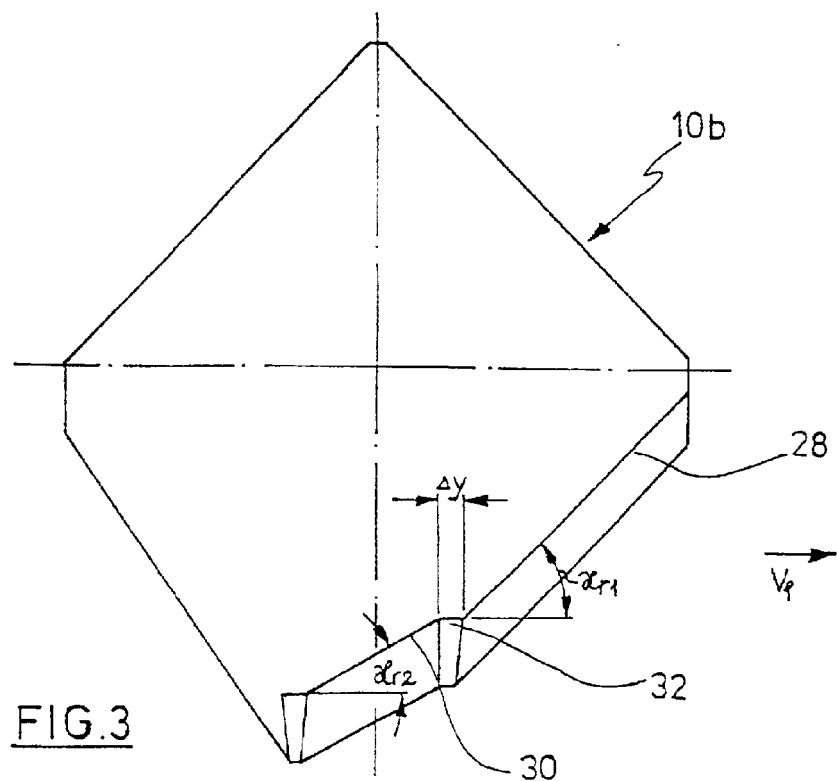
FIG. 3 schematically shows a perspective view of a third embodiment of the cutting blade according to the invention.
Figure 4:
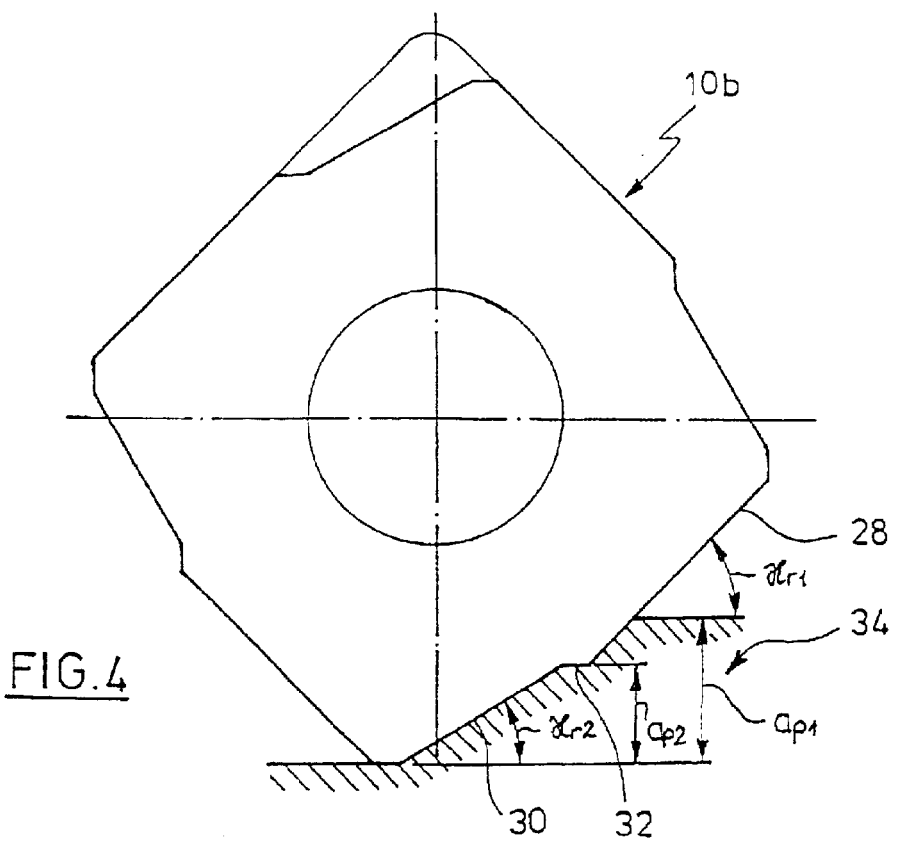
FIG. 4 shows a top view of the cutting blade of FIG. 3 being in engagement with a workpiece.

The reversible cutting blade 10b of FIG. 3, with regard to its cutting edge, again is divided into two cutting edge portions 28, 30 between which there is a step 32. The steps extends in the direction of feed $V_f$ of the tool, which can be seen particularly well from FIG. 4. In FIG. 4, the workpiece which is engaged by the reversible cutting blade 10n is also outlined at 34. The range of engagement is outlined by phantom lines. It can further be seen that the setting angle $\kappa_2$ of the cutting edge portion 30 is 30°, for instance, and that of the cutting edge portion 28 $\kappa_1$ is 45°, for instance. Here, the cutting edge portion 30 works out the substantial share of the milling depth $a_{p2}$ which, for instance, is 2 mm whereas the cutting edge portion 28 only works out a share $a_{p1}$ which is 1 mm, for instance. The offset $\Delta y$ is 0.5 mm, for instance.

Figure 5:
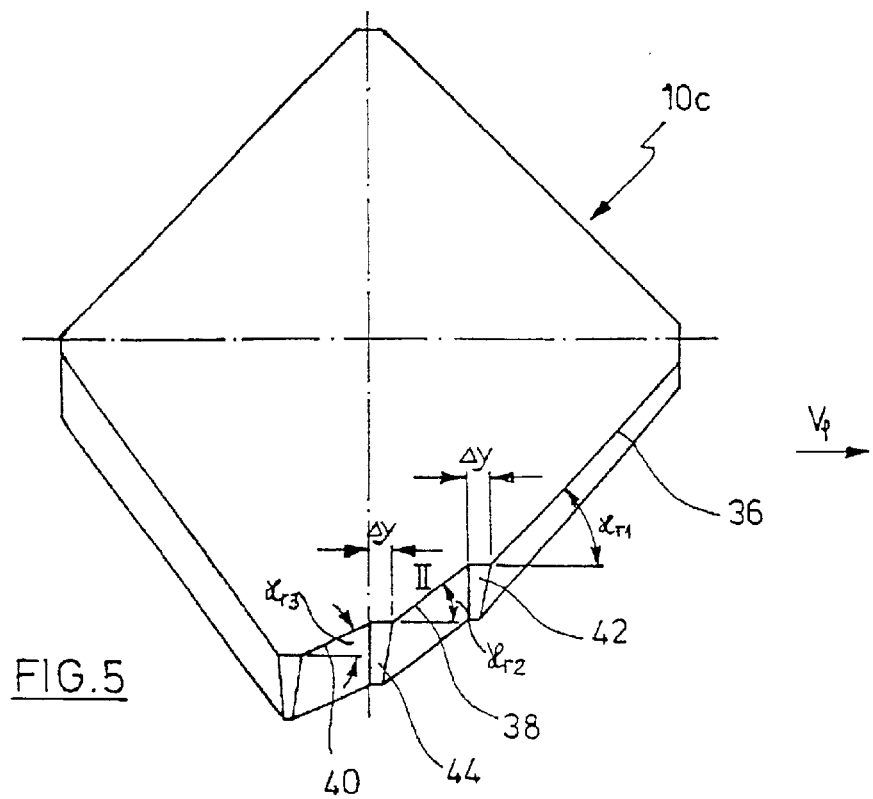
FIG. 5 schematically shows a perspective view of a fourth embodiment of the cutting blade according to the invention.
Figure 6:
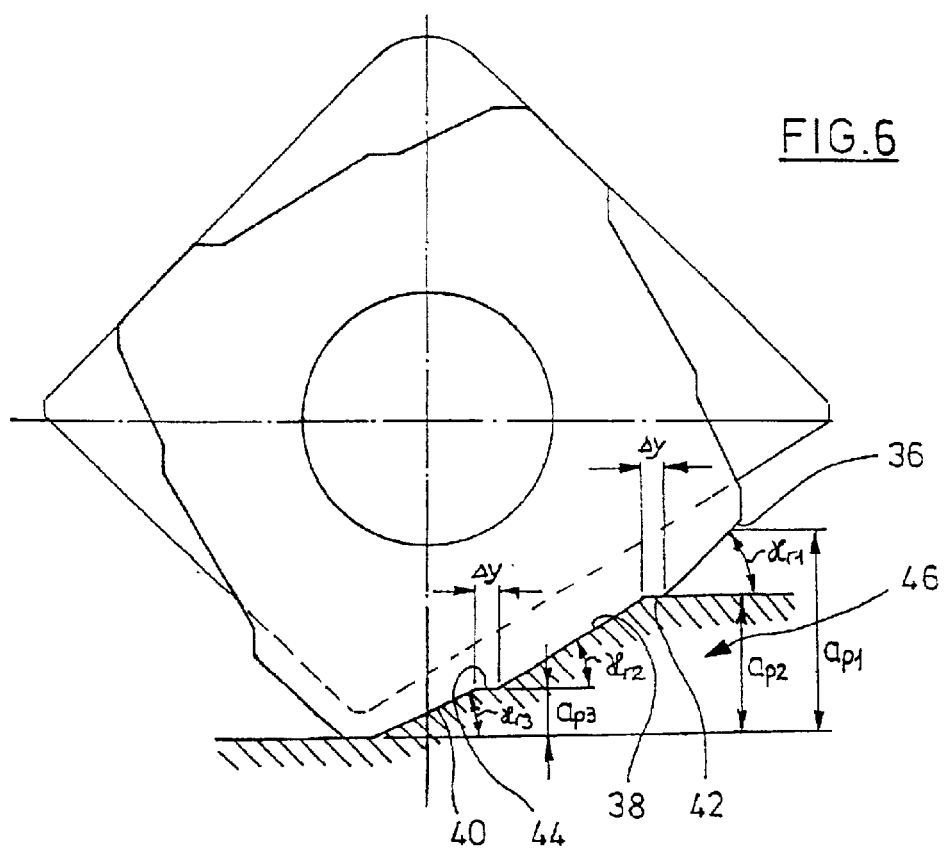
FIG. 6 shows a top view of the blade of FIG. 5 being in engagement with a workpiece.

In the cutting blade of FIG. 5, the cutting edge has been subdivided twice in the direction of feed as can be seen from the cutting edge portions 36, 38, 40 between which the steps 42, 44 are which, in turn, extend in the direction of feed as ensues specifically from FIG. 6. It can be seen from FIG. 6 that the setting angle $\kappa_{r1}$ is 45°, for instance, the setting angle $\kappa_{r2}$ is 30°, for instance, and the setting angle $\kappa_{r3}$ is 25°, for instance. Thus, the cutting edge portion 40 which is in the deepest engagement with the workpiece 46 is provided with the smallest setting angle whereas the setting angle increasingly augments towards the "top". What can further be seen from FIG. 6, for instance, is that the cutting edge portion 40 $a_{p3}$ which is 1 mm, for instance, the cutting edge portion 38 $a_{p3}$ which is 2 mm, for instance, and the cutting edge portion 36 $a_{p1}$ do not have any share in the milling depth. The offset $\Delta y$ in the direction of feed is 0.5 mm, for instance. This also corresponds to the offset $\Delta y$ of FIGS. 3 and 4.

Figure 7:
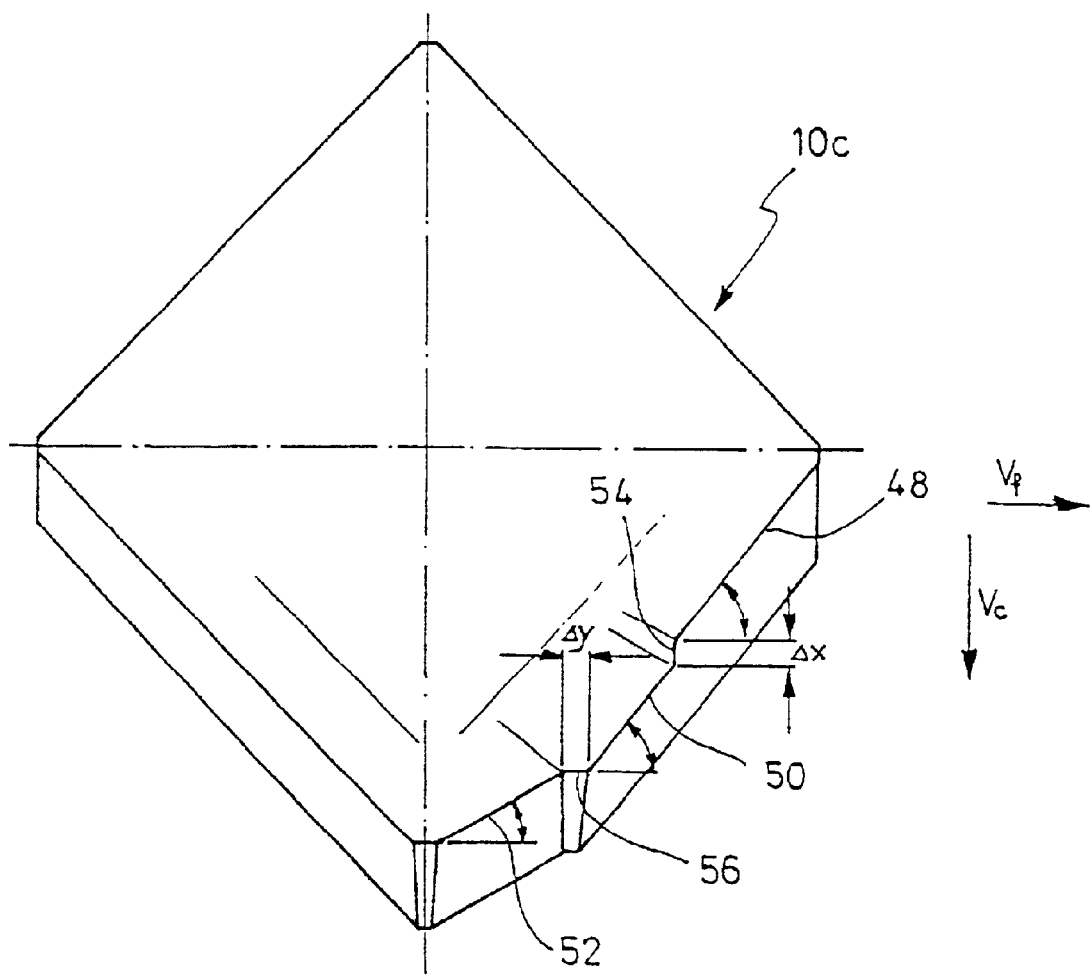
FIG. 7 schematically shows a perspective view of a fifth embodiment of the cutting blade according to the invention.

The reversible cutting blade of FIG. 4, with regard to its cutting edge, again is subdivided into three portions, i.e. portions 48, 50, and 52 with the portions 48, 50 merging into each other via a step 54 that extends in the direction of cut $V_c$ whereas the portions 50, 52 merge into each other via the step 56 which runs in the direction of feed $V_f$. Thus, the embodiment of FIG. 7 both shows a subdivision of the cut in the direction of cut and one in the direction of feed. As to the setting angles, the same applies as does to the embodiment of FIGS. 5 and 6.

It is known to design the run of cutting edges as being inclined relative to the underside of the reversible cutting blades with a view to making softer an engagement with the workpiece. This possibility may also be envisaged in the embodiments shown in FIGS. 1 to 7. It is not illustrated, however.

As was initially noted the invention is not limited to rotary cutting tools such as milling cutters or the like, but also comprises stationary cutting tools such as lathe tools which work on a rotating workpiece.

The above Examples and disclosure are intended to be illustrative and not exhaustive. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

What is claimed is:

1. A cutting tool with a holder body rotating about a central axis on which at least one cutting blade is mountable which has at least one cutting edge that gets in a metal-cutting engagement with a workpiece when the holder body rotates while simultaneously undergoing a linear forward feed, wherein the cutting blade is adapted to be advanced to a predetermined cutting depth, characterized in that the cutting edge of the cutting blade is comprised of at least two cutting edge portions which are disposed in an offset relationship to each other in such a way that they each make a partial contribution to the predetermined cutting depth by means of a different setting angle (κ) relative to each other, and in that between the cutting edge portions an offset in feed direction $V_1$ is provided.

2. A cutting tool having a holder body to which at least one cutting blade is attachable which has at least one cutting edge that gets into a chip-cutting engagement with a rotary workpiece, and undergoes a linear feed motion with the cutting blade being adapted to be advanced to a predetermined cutting depth, characterized in that the cutting edge of the cutting blade is comprised of at least two cutting edge portions which are disposed in an offset relationship to each other in such a way that they each make a partial contribution to the predetermined cutting depth by means of a different setting angle (κ) relative to each other, and in that between the cutting edge portions an offset in feed direction $V_1$ is provided.

3. The cutting tool as claimed in claim 1, characterized in that the share contributed by the cutting edge portions to the cutting depth is equal.

4. The cutting tool as claimed in claim 1, characterized in that the share contributed by the cutting edge portions to the cutting depth is different.

5. The cutting tool as claimed in claim 1, characterized in that the setting angle (κ) of the cutting edge producing the remaining depth is larger than that of the other cutting edge portion disposed thereabove.

6. The cutting tool as claimed in claim 1, characterized in that the setting angle of the cutting edge producing the remaining depth is smaller than that of the other cutting edge portion disposed thereabove.

7. The cutting tool as claimed in claim 1, characterized in that the offset (16, 24, 26) of the spaced cutting blade portions (12, 14; 18, 20, 22) is provided in the direction of cut (Vc) of the cutting blade (10, 10a).

8. The cutting tool as claimed in claim 1, characterized in that the offset of adjacent cutting blade portions (28, 30, 36, 38, 40) is provided in the direction of feed (Vf) of the cutting tool.

9. The cutting tool as claimed in claim 7, characterized in that a transition point between the cutting blade portions (12, 14, 18, 20, 22) is accomplished by about twice 90°.

10. The cutting tool as claimed in claim 9, characterized in that the metal-cutting surfaces associated with the cutting edge portions form a step on the transition point.

11. The cutting tool as claimed in claim 8, characterized in that the cutting edge portion of the transition point extends in the direction of feed.

12. The cutting tool as claimed in claim 7, characterized in that if there are three or more cutting edge portions an offset is provided in the direction of cut and an offset is provided in the direction of feed.

13. The cutting tool as claimed in claim 1, characterized in that the cutting blades are reversible cutting blades (10a to 10c).

14. The cutting tool as claimed in claim 1, characterized in that the cutting blades are loaded in a cassette which, in turn, is loaded on the holder body.

15. The cutting tool of claim 1 wherein between the cutting edge portions an offset in cutting direction $V_c$ is provided.

16. The cutting tool of claim 2 wherein between the cutting edge portions an offset in the cutting direction $V_c$ is provided.

* * * * *